Figure 1:
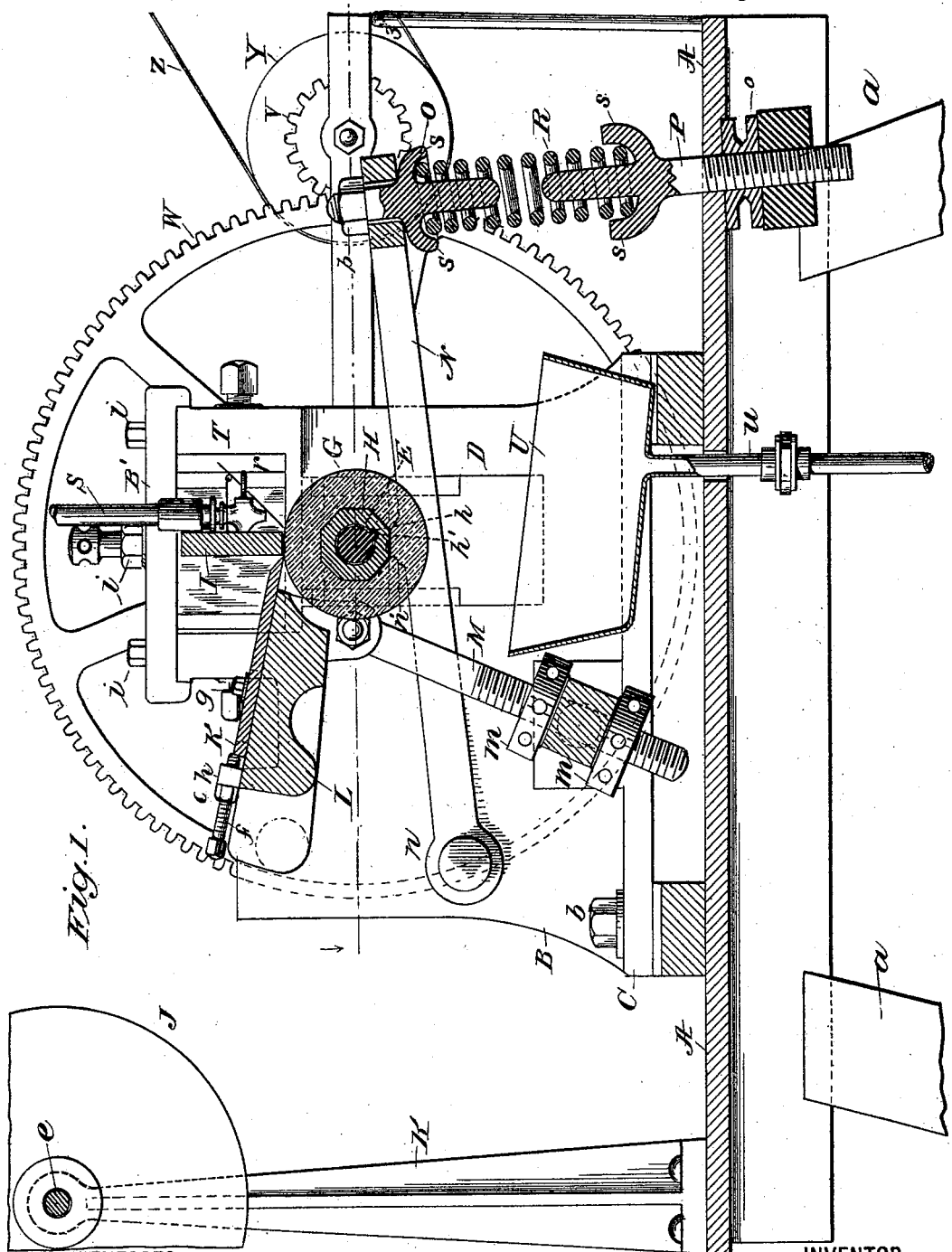

(No Model.) 3 Sheets—Sheet 1.

J. R. FRANCE.
MACHINE FOR CUTTING SHEETS OR FILMS OF PYRALIN.

No. 498,257. Patented May 30, 1893.

WITNESSES:
Edward O. Rowland.
E. M. Taylor

INVENTOR
Joseph R. France
BY
Redding & Kiddle
ATTORNEYS (No Model.) 3 Sheets—Sheet 2.

J. R. FRANCE.
MACHINE FOR CUTTING SHEETS OR FILMS OF PYRALIN.

No. 498,257. Patented May 30, 1893.

WITNESSES:
Edward C. Rowland.
E. M. Taylor.

INVENTOR
Joseph R. France
BY
Redding & Kiddle
ATTORNEYS (No Model.) 3 Sheets—Sheet 3.

J. R. FRANCE.
MACHINE FOR CUTTING SHEETS OR FILMS OF PYRALIN.

No. 498,257. Patented May 30, 1893.

WITNESSES:
INVENTOR
Joseph R. France
BY
ATTORNEYS

UNITED STATES PATENT OFFICE.

JOSEPH R. FRANCE, OF NEW YORK, N. Y.

MACHINE FOR CUTTING SHEETS OR FILMS OF PYRALIN.

SPECIFICATION forming part of Letters Patent No. 498,257, dated May 30, 1893.

Application filed July 7, 1892. Serial No. 439,288. (No model.)

*To all whom it may concern:*

Be it known that I, JOSEPH R. FRANCE, of New York city, in the county and State of New York, have invented certain new and useful Improvements in Machines for Cutting Sheets or Films of Pyralin, of which the following is a specification.

The object of my invention is to produce a continuous, uniform, homogeneous and highly attenuated sheet, strip, ribbon or film of pyralin, celluloid, zylonite or other solid compound of pyroxyline, or compounds having pyroxyline as a base, of any desired length and of any desired uniform width and thinness, and by my invention such a continuous uniform and homogeneous strip, ribbon, sheet or film can be cut from a solid block of pyralin, celluloid, zylonite or other solid compound of pyroxyline in one continuous length, the length of the film, ribbon, sheet or strip so cut being dependent upon the diameter of the block or cylinder from or into which the ribbon or sheet is cut, and the thinness of the sheet; and my invention consists especially in the cutting, shaving, converting or changing a solid block of pyralin, celluloid, zylonite or other solid compound of pyroxyline into a continuous ribbon, strip, sheet or film, so that when the block is cut through there shall be just as much material in the continuous strip or ribbon when cut as there was in the solid block before cutting, and as far as I am aware, no machine or process has ever before been known or used whereby this desirable result can be attained. I am aware, however, that there are machines in use for cutting strips or sheets of material from solid blocks, as in cutting veneering from wood and in producing rubber sheeting, and also in the art to which this invention relates, machines have been used whereby a strip or sheet may be turned off from the exterior surface of a block at every revolution thereof, cutting the block not into one continuous ribbon or film but into separate strips or sheets, each of a length according to the thickness or diameter of the block and the thickness of the strip.

Besides the feature that by my invention the novel product is produced of a continuous ribbon, sheet, film or strip of pyralin, sliced or shaved in a continuous length from a solid block or piece of pyralin or similar compounds, such ribbon or sheet so produced may be of any desired thinness from one to three one thousandths of an inch in thinness, and the machine which I have invented for cutting such ribbon or film is so constructed as to be adjustable in this respect and so that the film may be cut in any predetermined desired thinness; and there are many other novel features which my invention comprises, more particularly set forth in the claims hereinafter following.

Figure 2:
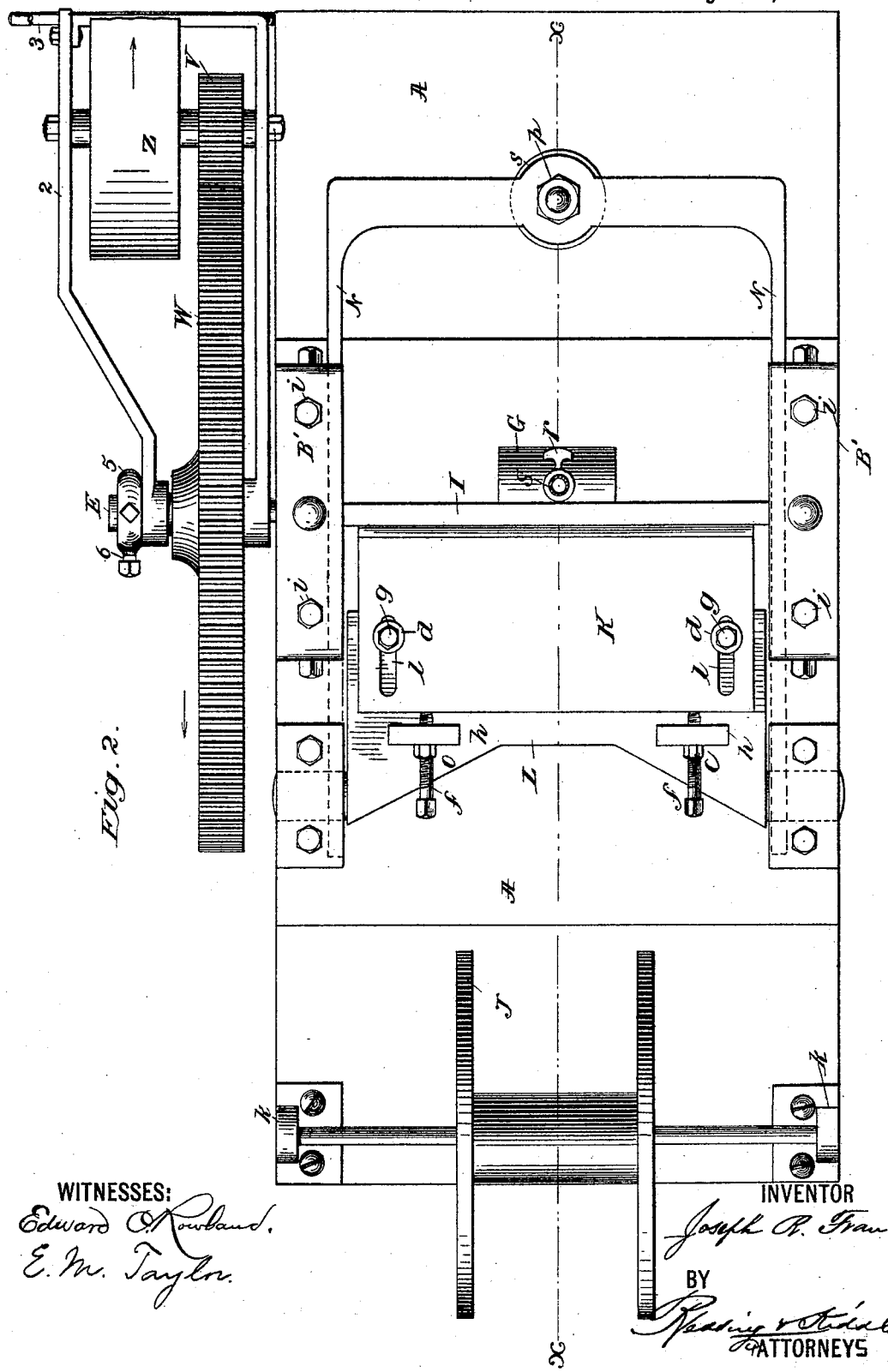
Figure 3:
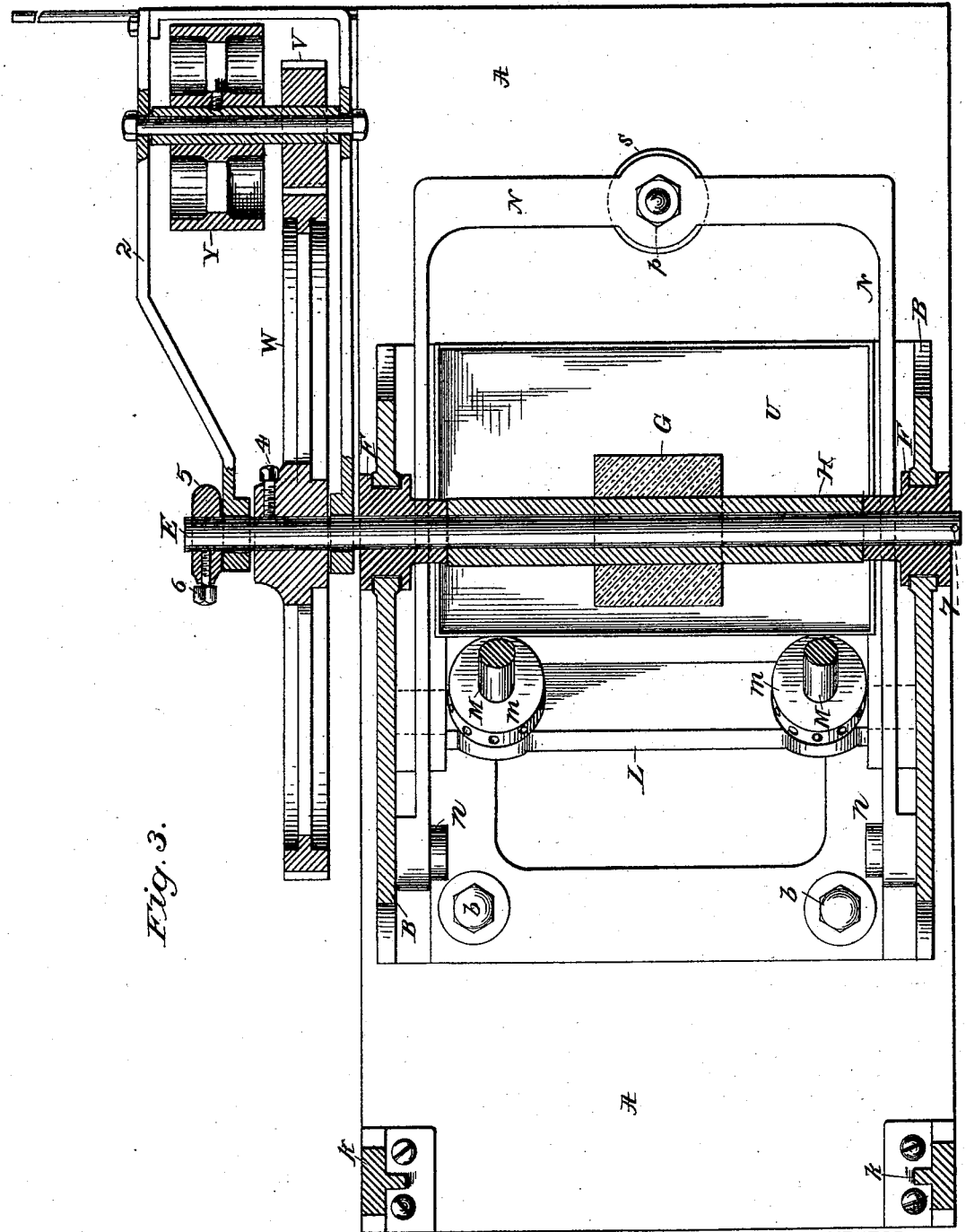

In the accompanying drawings forming a part hereof: Figure 1 is a side view taken through line $x$—$x$ of Fig. 2, partly in elevation and partly in section, of a machine embodying my invention. Fig. 2 is a top view of the machine shown in Fig. 1; and Fig. 3 is a view from the under side partly in section of a portion of the machine shown in Fig. 1, showing the movable or adjustable journal-bearings for the mandrel.

A is a table or platform supported on legs or supports $a$ and to or upon this table is secured a metal frame B which supports and to which are attached the several parts of the machine embodying my invention shown in the drawings, and this frame B has a base plate C which is secured to the table A by bolts $b$. From the base-plate C rises two standards D into which are journaled the bearing ends of a rotating mandrel or shaft E, and these standards D are cut out, slotted or grooved as shown in Fig. 3 into which grooves or slots the journal boxes F are adapted to move or slide, thereby attaining adjustability and movability of the journal-bearings of the mandrel E for the reasons and advantages to be hereinafter set forth. To this mandrel E is securely united, placed or affixed, a mass of pyralin, celluloid or other solid compound of pyroxyline and which mass of pyroxyline compound has been affixed thereon by means of heat and pressure in a suitable mold or receptacle preferably cylindrical in form, or in any other convenient and effective manner whereby to affix on the mandrel a solid cylinder of pyroxyline compound G as shown in Fig. 1 and this cylinder of pyralin is maintained securely affixed to the mandrel preferably as shown and described by the use of the octagonal shaped core H over which or to which the pyralin is placed and secured and which core has a groove $h'$ cut in it on the inside along its length and which fits over the spline $h^2$ on the mandrel E or into which groove $h'$ in the core the spline $h^2$ on the mandrel E slides whereby the mandrel and core are keyed together; but I do not mean to limit my invention to the use of any particular means or method of affixing the pyralin or other compound of pyroxyline on the mandrel, nor to the diameter or length of the cylinder of pyralin affixed thereto.

Above the cylinder and secured to the frame B in a suitable and secure manner is attached an adjustable device preferably a bar I of a length equal to or greater than the length of the cylinder and against which bar the cylinder of pyralin is adapted to press in the operation of the machine, and this bar is first adjusted to the desired position in relation to the pyralin cylinder and is maintained fixed in such pre-determined position by means of the nuts $i$ which are screwed down to a crosspiece B' forming part of the frame B, as shown in Figs. 1 and 2; while I have shown and described a bar as the device against which the pyralin cylinder presses, I do not limit myself to a bar, but I can also employ within the spirit of my invention a roller or any other suitable means for receiving the pressure of the pyralin cylinder, or instead of having a square-edged bar, the edge of the bar which is adapted to engage with the pyralin cylinder may be made round or convexed, and this device is preferably so placed as that the pressure will be in a straight line passing directly through the center of the cylinder of pyralin and immediately in front of the cutting mechanism, to be presently described hereinafter.

The cutting mechanism which I preferably employ, consists of a wide or broad knife K having a bevel-edge and this knife is of a length equal to or greater than the cylinder of pyralin and is placed preferably on a slight horizontal angle, as shown in Fig. 1 and rests upon a suitable support or plate L; it is adjustable both as to the angle of its position with relation to the pyralin cylinder and the nearness of its cutting edge to such pyralin cylinder, the position of the knife being determined according to the thinness or thickness of the continuous ribbon, sheet or film which it is desired to cut the pyralin cylinder into. As shown in Fig. 1, knife K rests upon the surface of plate L and slots $l$ are cut through said knife into which are adapted to pass bolts or screws $d$ and knife K is adapted to be moved forward toward the pyralin cylinder by the screws or bolts $f$, which engage with the outer edge of the knife which is secured in the desired position by means of nuts $g$ which are screwed over the bolts $d$ on to the knife holding it securely in position to the plate L; and the knife is further secured against movement out of position by means of the nuts $c$ which pass over the bolts $f$ and engage with lugs or projections $h$ which rise from the plate L, all of which will be readily understood from the drawings, see Figs. 1 and 2.

The position or angle of the knife is adjusted by the bars M, connected with the plate L on both sides thereof, and the nuts $m$ which screw over said bars M, the knife K resting on the plate L to which, as stated, are connected the bars M which bars are screw-threaded at their lower ends, and over which screw threaded ends are screwed the nuts $m$ the ends of the two bars M being connected together by cross-bar M' located between said nuts $m$ $m$ as shown in Fig. 1 and with which cross-bar said nuts engage, so that when the nuts $m$ are screwed thereover, said bars will both be moved, thereby raising or lowering the front end of the plate L or that end of the plate L which is nearest to the pyralin cylinder intended to be cut, and at the same time raising and lowering the knife K, changing the angle of its position with relation to the pyralin cylinder G; and from the foregoing it will be seen that according as the knife is placed or adjusted in position with relation to the cylinder G, both as to its horizontal angle and the distance of its cutting edge from the cylinder, will be the thickness or thinness of the sheet, film or ribbon cut from the pyralin cylinder. I do not intend, however, to limit my invention to the use of the cutting mechanism shown and described since, instead of a straight-edge adjustable knife adapted to be maintained rigid when adjusted, I can employ within the spirit of my invention any other suitable cutting mechanism, such as a rotary knife for example.

As before stated, the bar I when once adjusted in position, is maintained in such position and the pressure is from or by the pyralin cylinder against such bar and which pressure is obtained in one convenient and efficient manner by the mechanism shown in the drawings in Fig. 1 in which N is a frame passing around the machine pivoted on both sides of the machine at $n$ as shown in Fig. 3 and to the opposite end of said frame in the middle thereof is connected or attached the device shown in Fig. 1 in which O is a bar constructed as shown, the upper end of which is screw-threaded and passes through the frame N at or near its center and is secured thereto by means of the nut $p$, and a similar bar screw-threaded at one end passes through the table or platform A and is secured thereto or to the floor or foundation on which the table rests by means of the nut $o$ and over and between these two bars is placed a heavy spiral spring R, which spring is kept in position by means of the concave flanges or ridges $s$ projecting from said bars and which provide bearings or containing surfaces for said springs and the tension of the spring is determined and regulated by the distance between the bars O and P, and such distance between said bars O and P can be varied and is regulated by screwing said bars in or out of their respective bearings in the frame N and table A. The sides of the frame N rest or press up against the ends of the mandrel E at the points n' on both sides, at which points the upper edge of the frame N is slightly wider so as to form the rounded lugs or projections shown in the drawings, and as the spring is compressed between the flanges s and the tension of the spring R being upward, the pressure will thereby be applied to the mandrel E through the frame N; and according to the size of the spring R and its resistance to compression will be the pressure which it creates through the side pieces of the frame N on the mandrel E and the consequent pressure of the pyralin cylinder against the bar I.

I do not mean to limit my invention to the particular construction or class of compression devices shown and described, since any suitable contrivance or mechanism for attaining the requisite pressure on the mandrel or cylinder may be employed within the spirit of my invention.

As before stated, the bearings of the mandrel E are movable, that is to say, the boxes F are adapted to slide in the grooves or slots in the standards D and as the diameter of the pyralin cylinder is reduced as the cylinder rotates in the process of cutting, the pyralin cylinder will be kept constantly pressed with substantially the same degree of pressure against the fixed bar I or other suitable device during the entire process of cutting, since the side pieces of the frame N always rest against the ends of the mandrel and are maintained against such mandrel by means of the pressure exerted on them by the spring R or other compression device, as before explained.

The mandrel is rotated in any suitable manner and one means for rotating said mandrel is shown in the drawings in which W is a large cog-wheel attached to one end of the mandrel and which is adapted to engage with a smaller cog-wheel V secured on the shaft t to which shaft is also secured a pulley Y over which passes a belt Z which runs to and over another pulley which is operated or rotated by the driving mechanism directly or by other intermediate gearing, as will be readily understood; the shaft t has its bearings in a frame 2 one end of such frame resting on the rod 3 and the other end providing partial bearings for one end of the mandrel E and the cog-wheel W is secured thereon by the screw or pin 4 and the collar 5 and screw or pin 6 which is placed outside the frame 2. When the pyralin cylinder has been cut through or when it is desired to cut from another cylinder, the screws 4 and 6 are turned out, the collar 5 removed. The pin 7 on the other end of the mandrel is also removed and the mandrel and frame and wheel W slid out, the frame riding on the rod 3 and as the other end of the mandrel will now be away from its bearing the cylinder G and core H can be slid or drawn off the mandrel and another cylinder inserted or sleeved thereon and the mandrel put in place again, the frame 2 moved back and the collar 5 and the bolts 4, 6 and 7 securely screwed down and all the parts are again in operative condition. When the pulley Y rotates, the cog-wheel V will rotate thereby rotating the wheel W which will rotate the mandrel E and with it the pyralin cylinder G and when the knife and other parts of the machine are adjusted in position, the cylinder G will be cut into one continuous uniform homogeneous film, strip, ribbon or sheet or into a number of such ribbons, sheets or films as desired, the width of such ribbon or ribbons and the thinness or thickness thereof being determined by the length of the pyralin cylinder and the position of the cutting knife; and the length of the ribbon, in the case where a continuous ribbon is desired to be cut, will depend upon the thinness of the film and the diameter of the cylinder from which it has been cut and in such case there will be just as much pyralin in the ribbon or film when cut as there was in the block or cylinder of pyralin before cutting as hereinabove stated.

Immediately to the opposite side of the bar I, or the side opposite the cutting knife, is placed a pipe S connected with a suitable reservoir for water (not shown) the flow from which pipe being regulated by the cock r and the flow is directed on the pyralin cylinder by means of a guide T which may consist of a piece of tin or other convenient means whereby the water as it flows from the pipe will be directed on to the cylinder so as to keep it cool in the process of cutting, and as the water drops from the cylinder it will fall into a drip-pan U placed immediately underneath and be carried off through the pipe u to any convenient receptacle, not shown. As the film or ribbon is cut, it is taken and run over a revolving reel J which is secured on a shaft e, which is supported from standards k rising from and secured to the plate A as shown in Figs. 1 and 2 and when the pyralin cylinder has been cut through and the film, ribbon or sheet into which it has been cut has been wound upon the reel J, such film, ribbon or sheet is then taken and subjected to subsequent treatment according to the purpose for which it is desired to use it.

What I claim as my invention, and desire to secure by Letters Patent, is—

1. In a machine for cutting pyralin or other solid compounds of pyroxyline, the combination with a cutting mechanism of a mandrel which supports or to which is secured a mass of said pyralin or other solid compound of pyroxyline, and movable journals or bearings for said mandrel, said journals or bearings being adapted to move or travel in a direction toward the cutting mechanism in the operation of cutting, substantially as and for the purpose set forth.

2. In a machine for cutting pyralin or other solid compounds of pyroxyline, the combination with a cutting mechanism of a mandrel which supports or to which is secured a mass of said pyralin or other solid compound of pyroxyline, movable journals or bearings for said mandrel adapted to move or travel in a direction toward the cutting mechanism in the operation of cutting, and a fixed bar or other fixed device against which said mass of pyralin is adapted to press, substantially as and for the purpose set forth.

3. In a machine for cutting pyralin or other solid compounds of pyroxyline, the combination with a cutting mechanism of a mandrel which supports or to which is secured a mass of pyralin or other solid compounds of pyroxyline, movable journals or bearings for said mandrel adapted to move or travel in a direction toward the cutting mechanism in the operation of cutting, a device against which said mass of pyralin is adapted to press, and adjustable automatically operating means for pressing said mass of pyralin against said device, substantially as and for the purpose set forth.

4. In a machine for cutting pyralin, or other solid compounds of pyroxyline, the combination with an adjustable cutting mechanism of a mandrel which supports or to which is secured a mass of pyralin or other solid compound of pyroxyline, adjustable movable bearings for said mandrel, adapted to move or travel in a direction toward the cutting mechanism in the operation of cutting an adjustable device adapted to be maintained fixed when adjusted in position against which said mass of pyralin is adapted to press and adjustable means for pressing said mass of pyralin against said device, substantially as and for the purpose set forth.

5. In a machine for cutting pyralin or other solid compounds of pyroxyline, the combination with an adjustable cutting mechanism of a mandrel which supports or to which is secured a mass of pyralin or other solid compound of pyroxyline, said mandrel being adapted to move or travel in a direction toward the cutting mechanism in the operation of cutting, an adjustable device located in front of said cutting mechanism adapted to be maintained in a fixed position when adjusted and against which said mass of pyralin is adapted to press, adjustable means for pressing said mass of pyralin against said device during the operation of cutting, and means for rotating said mandrel and the pyralin thereon, substantially as and for the purpose set forth.

6. As a new article of manufacture, a continuous, homogeneous ribbon, strip, sheet or film of pyralin or other compound of pyroxyline, of any desired uniform width and thinness, cut or shaved in a continuous length from a solid block of said pyralin or other compound of pyroxyline.

7. In a machine for cutting pyralin or other solid compounds of pyroxyline, the combination of the adjustable knife K, plate L and the lugs $h\ h$ thereof, bolts $f\ f$ and nuts $c\ c$, a mandrel which supports or to which is secured a mass of said pyralin or other solid compound of pyroxyline, cylindrical in form, and means for rotating said pyralin cylinder so as to cut said cylinder into a continuous film, strip, sheet or ribbon, substantially as set forth.

8. In a machine for cutting pyralin or other solid compounds of pyroxyline, the combination with the adjustable knife K having slots $l\ l$ into which are adapted to move bolts $d\ d$ and nuts $g\ g$ to hold said bolts in said slots, bolts $f$ and nuts $c\ c$, plate L and lugs $h\ h$ thereof, bolts M and nuts $m\ m$, a mandrel which supports or to which is secured a mass of said pyralin or other solid compound of pyroxyline, cylindrical in form, movable journals or bearings for said mandrel, and a fixed device against which said pyralin cylinder is adapted to press and means for pressing said cylinder against said knife which consists of the frame N, bars O and P having the rims $s\ s$ and spring R and means to rotate said mandrel and with it the pyralin cylinder, all arranged to operate substantially as and for the purpose set forth.

9. In a machine for cutting pyralin or other solid compounds of pyroxyline, the combination with an adjustable cutting mechanism of a mandrel which supports or to which is secured a mass of said pyralin or other solid compound of pyroxyline, cylindrical in form, an adjustable device against which said cylinder of pyralin is adapted to press in the operation of cutting, and means for pressing said pyralin cylinder against said device, which consists of the frame N, bars O and P having ridges $s\ s$ thereon and a spring R, all arranged to operate substantially as set forth.

This specification signed and witnessed this 1st day of July, 1892.

JOSEPH R. FRANCE.

Witnesses:
CARL STEINKE,
R. J. SICKELS.